March 15, 1966   A. J. CAMPANELLA   3,241,041
AUTOMATIC POWER REGULATOR EMPLOYING A TRANSISTOR
CONTROLLED ELECTRON TUBE
Filed May 9, 1961
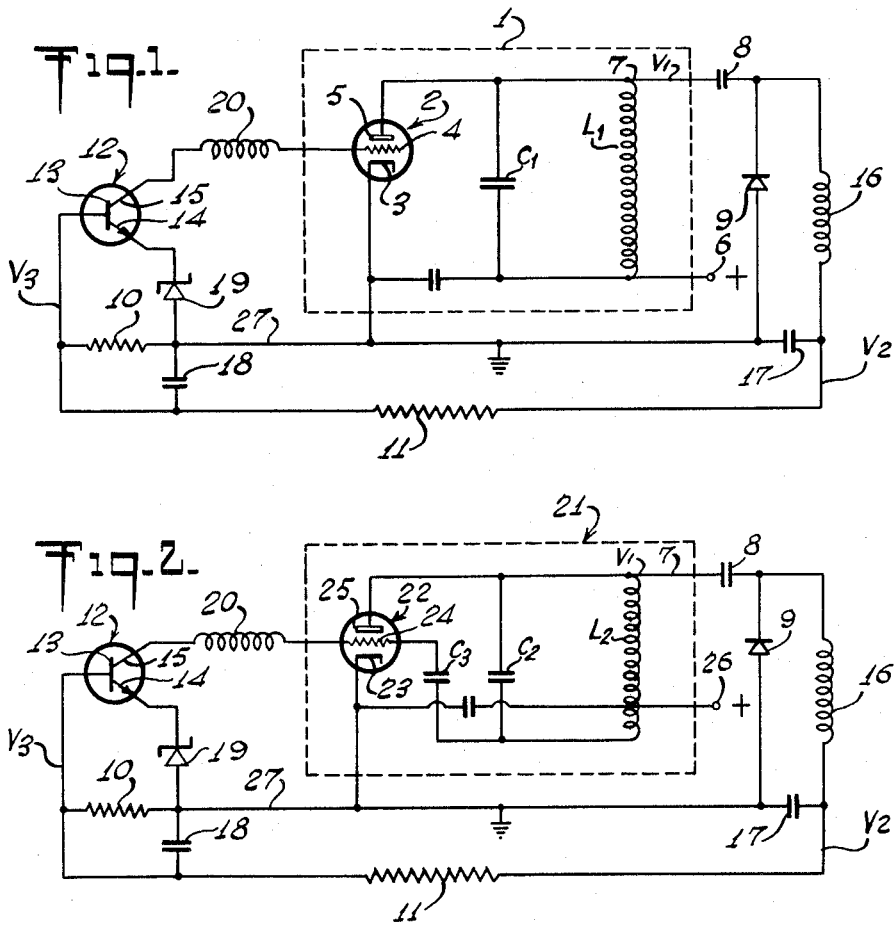
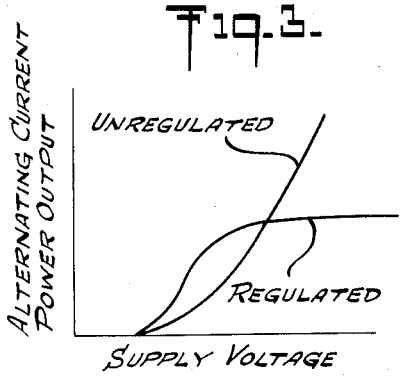
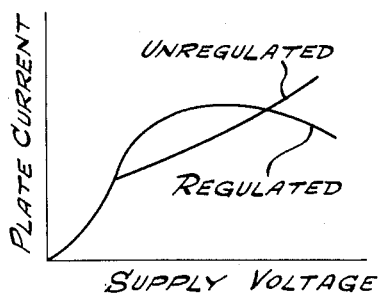
INVENTOR
ANGELO J. CAMPANELLA
BY
Roy C. Hoppard
ATTORNEY

United States Patent Office 3,241,041
Patented Mar. 15, 1966

3,241,041
AUTOMATIC POWER REGULATOR EMPLOYING A TRANSISTOR CONTROLLED ELECTRON TUBE
Angelo Joseph Campanella, State College, Pa., assignor to HRB-Singer, Inc., State College, Pa., a corporation of Delaware
Filed May 9, 1961, Ser. No. 108,846
2 Claims. (Cl. 323—22)

This invention relates to a power regulator. More specifically, it relates to circuitry for automatically regulating the power output of electrical circuits to compensate for fluctuations in the circuit power supply.

The alternating current power output and direct current power consumption of electrical output circuits, such as, class C power amplifiers or self-excited alternating current oscillators, vary widely as a function of the applied direct current plate and heater voltages. These variations are caused either by fluctuations in the load of the power supply, or, by a voltage decrease from the storage battery supply during its discharge.

Ordinarily when plate and heater voltages are supplied by storage batteries or dry cells, it is because of a necessity to reduce the weight of the equipment to a minimum; such equipments, for example, are satellites, buoys and portable transmitters. The regulation of such unattended battery supplied equipment has been inefficient, and therefore a substantial reduction in the life of the power supply has resulted. Moreover, if these voltages are not regulated, wide variation of the alternating current power output, which occurs with the fluctuations in supply voltage, and the attendant operational inefficiency must be tolerated.

Accordingly, it is an object of the invention to provide an arrangement of components, requiring no additional power, for automatically regulating the power output and, hence, the power requirements, of circuits, such as, class C or $AB_2$ power amplifiers, self-excited alternating current oscillators and the like.

It is a second object of the invention to provide automatic regulating circuitry to control the current drain of an electrical output circuit and, therefore, to increase the life of the circuit power supply.

In accordance with an aspect of the invention, a portion of the output from an electrical circuit is sampled, rectified and fed back to a semiconductor device, having input, output and control electrodes. The output of the semiconductor device comprises a control voltage which is the product of the rectified D.C. grid current of the triode and the transistor collector impedance. The output impedance of the semiconductor device and, therefore, the bias voltage supplied to the electrical output circuit are dependent on the sampled output energy which varies as a function of the supply voltage. This voltage is fed into the grid of the triode. Since the bias voltage controls the current drain of the electrical output circuit, it also balances out the effect of variations in the supply voltage so as to maintain the power output constant.

The above-mentioned and other features and objects of this invention and the manner of attaining them will become more apparent and the invention itself will be best understood by reference to the following description of an embodiment of the invention taken in conjunction with the accompanying drawing, wherein:

FIGURE 1 is a circuit diagram of a regulated class C power amplifier;

FIGURE 2 is a circuit diagram of a regulated self-excited alternating current oscillator;

FIGURE 3 is a curve depicting the relationship of the alternating current power of an electrical output circuit to the supply voltage; and, FIGURE 4 is a curve depicting the relationship of the plate current of an electrical output circuit to the supply voltage.

Referring now to FIGURE 1, a class C power amplifying circuit is indicated in the broken-line block 1 and includes a vacuum tube triode 2, having cathode 3, grid 4 and plate 5 electrodes. Plate power is supplied from a positive voltage supply 6 of the storage battery or dry cell type. The output power of the amplifier circuit is furnished along the lead 7 from the triode plate 5. It will be understood by those skilled in the art that A.C. input signals are applied to grid 4 of triode 2, and that an amplified A.C. output signal is developed in the plate circuit of the triode, which comprises a parallel resonant circuit formed by an inductance L1 and a capacitance C1. In this particular embodiment of the invention, the power to be regulated is the A.C. output power of the amplifier circuit, i.e. the A.C. power developed in the inductance L1.

A portion of the voltage $V_1$ of the output power is sampled by a capacitor 8 and rectified by a diode 9 to produce a direct current voltage $V_2$; the alternating current component of the rectified current being filtered by a choke 16 and capacitor 17 which are connected in parallel with the diode 9.

Resistor 10, which is series connected to the output sides of the diode 9 and capacitor 17, and resistor 11, which is series connected to the choke 16, form a voltage divider. The rectified voltage $V_2$ is fed to the voltage divider which produces a voltage $V_3$ on the base or control electrode of a semiconductor device, such as, an NPN transistor 12, having base 13, emitter 14 and collector 15 electrodes. A reference voltage from a Zener reference diode 19, which is connected at one end to an intermediate point of the voltage divider, is impressed on the emitter 14 of the transistor, and the output or collector electrode 15 of the transistor is connected through a choke 20 to the grid 4 of the amplifying tube.

Capacitor 18 is added to the regulator when the circuit is used in an amplitude modulated wave amplifier, i.e. when AM input signals are applied to grid 4. The capacitor is connected between one terminal of resistor 11 and a terminal of resistor 10. In conjunction with resistor 11, this capacitor acts to block the amplitude modulation component of the rectified voltage $V_2$ from being fed to the base of the transistor. When frequency modulation is utilized in the circuit, i.e. when FM input signals are applied to grid 4, capacitor 18 is not necessary, as the feedback effected by the amplitude modulated component of the direct current, rectified voltage $V_2$ will aid in reducing any residual amplitude modulation.

During operation, the power output of the amplifier circuit is dependent on the plate power as furnished by the supply 6 and the bias voltage applied to the grid 4 of the amplifying triode. If the amplifier circuit 1 is not being regulated and the supply voltage fluctuates, both the alternating current power output of the circuit and the plate current of triode 2 will vary in direct proportion to the change in the supply voltage. This aspect of operation may be more easily seen from the curves of FIGURES 3 and 4. However, by controlling the bias voltage applied to the grid of triode 2, as accomplished by the regulating circuitry of the invention, the power output of the amplifier and the plate current of triode 2 are made independent of any variations in the supply voltage. The bias voltage is dependent on the transistor emitter to triode grid resistance which is determined by the base to emitter current of transistor 12. Since the reference voltage applied to transistor emitter 14 is constant, this current is dependent on the voltage $V_3$ applied to transistor base 13, and hence, on the output power of circuit 1.

An approximately inverse relationship exists between the bias voltage and the plate current and, hence, between the bias voltage and the power output of the amplifying circuit. When the alternating current power in the amplifier plate circuit is low the voltage $V_3$ decreases and a decrease occurs in the resistance of the transistor collector to produce a less negative bias voltage on the amplifier. a proportionately greater alternating current power output and plate current will then result. In like manner, if the supply voltage is high producing a high alternating current power output, the voltage $V_3$ increases and an increase in the transistor collector resistance occurs to make the bias voltage more negative. The plate current and power output are then decreased. This results in decreasing the plate current drawn at higher plate voltages, thereby keeping the power output constant. As shown in FIGURES 3 and 4, the overall effect that is achieved by the automatic power regulating circuitry is to broaden the operating limits of the voltage supply. The initially smaller current drain increases the life of the storage battery or dry cell, and the later larger current drain produces useful power output from a supply voltage which is normally too low to provide useful power.

The automatic regulating circuitry of the invention is not limited to use with class C or $AB_2$ power amplifying circuits, but may also be utilized with other electrical output circuits. For example, in FIGURE 2 regulating circuitry is utilized with a self-excited alternating current oscillator. The oscillator circuit, which is shown in the broken line block at 21, includes a triode 22, having cathode, grid and plate electrodes 23, 24 and 25 respectively. Plate power is furnished by the voltage supply 26, which may be of the storage battery or dry cell type. In this embodiment, the frequency of oscillation is determined by a parallel resonant circuit comprising an inductance L2 and a capacitance C2 in the plate circuit of triode 22. The oscillations are sustained by feedback to grid 24 via capacitor C3. The power to be regulated in this circuit is the A.C. output of the oscillator circuit, i.e. the A.C. power developed in the inductance L2. The regulating circuit for this embodiment is identical to the regulating circuit described above in connection with the amplifier circuit of FIGURE 1.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:

1. An automatic power regulator for an electrical circuit, comprising a vacuum tube having an anode and a cathode and a control grid which draws current for a portion of the cycle of a signal applied thereto, an output circuit connected to said anode, means for sampling a portion of the output of said output circuit, rectifying means coupled to the output of said sampling means for producing a rectified voltage, a capacitor and a choke series connected with respect to each other and with said sampling means and parallel connected with said rectifying means, a first resistor series connected to the output of said choke, a second resistor series connected with the first resistor, capacitor and choke, one terminal of said first resistor being series connected to one terminal of said second resistor to form a common connection, a transistor, having base, emitter and collector electrodes, the emitter circuit of said transistor being serially connected between said control grid and said cathode so that said transistor constitutes the grid current return path from said grid to said cathode, said transistor base electrode being connected to the common connection between said first and second resistors, and a reference voltage diode connected between the second terminal of said second resistor and said transistor emitter electrode, said second terminal also being connected to the cathode of said tube, whereby a biasing signal is impressed on said base electrode to vary the emitter-collector impedance of said transistor, thereby to vary the grid-cathode potential on said tube so that the output power of said circuit is maintained substantially constant.

2. An automatic power regulator for an electric circuit comprising a vacuum tube having an anode and a cathode and a control grid which draws grid current for a portion of the cycle of a signal applied thereto, an input circuit connected between said control grid and said cathode, said input circuit including a variable impedance means in the form of a transistor having emitter, base and collector electrodes, the emitter-collector circuit of said transistor being serially connected between said control grid and said cathode so that said transistor constitutes the grid current return path from said grid to said cathode, reference voltage means connected in series with said emitter electrode in said grid-cathode circuit, an output circuit coupled between said anode and said cathode, means coupled to said output circuit for rectifying an output signal therein, the amplitude of said output signal being proportional to the power produced in said output circuit, means including a filter circuit coupled to said rectifying means for providing a filtered signal, a voltage divider connected between the output of the filter circuit and said cathode to produce a biasing signal which is smaller in amplitude than said filtered signal, and means for impressing said biasing signal on said base electrode, whereby the impedance of said transistor between said emitter and collector electrodes is caused to change with variations in the power in said ouput circuit, said impedance variations varying the bias voltage between the grid and cathode of said tube to thereby maintain said output power substantially constant.

References Cited by the Examiner

UNITED STATES PATENTS

| | | | |
|---|---|---|---|
| 2,416,922 | 3/1947 | Irish et al. | 323—38 X |
| 2,579,816 | 12/1951 | Gluyas | 323—38 X |
| 2,664,540 | 12/1953 | Beszedics | 323—22 |
| 2,847,637 | 8/1958 | Grib | 323—22 |
| 2,959,745 | 11/1960 | Grieg | 323—22 X |
| 2,962,651 | 11/1960 | McNamel | 323—22 |
| 2,963,637 | 12/1960 | Osborn | 323—22 |
| 2,968,738 | 1/1961 | Pintell | 323—22 X |
| 3,092,768 | 6/1963 | Kusko | 323—66 |

LLOYD McCOLLUM, *Primary Examiner.*

MILTON O. HIRSHFIELD, *Examiner.*